US008985696B2

(12) United States Patent
Yasuda et al.

(10) Patent No.: US 8,985,696 B2
(45) Date of Patent: Mar. 24, 2015

(54) VEHICLE SEAT

(75) Inventors: Kenzo Yasuda, Yokohama (JP);
Ryosuke Hayashi, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 114 days.

(21) Appl. No.: 13/620,279

(22) Filed: Sep. 14, 2012

(65) Prior Publication Data

US 2013/0069415 A1    Mar. 21, 2013

(30) Foreign Application Priority Data

Sep. 21, 2011   (JP) .................. 2011-206183

(51) Int. Cl.
*A47C 7/02*    (2006.01)
*B60N 2/68*    (2006.01)

(52) U.S. Cl.
CPC ............... *B60N 2/682* (2013.01); *B60N 2/686* (2013.01); *B60N 2205/30* (2013.01)
USPC ................... 297/452.18; 297/452.36

(58) Field of Classification Search
USPC ............. 297/452.31, 452.36, 452.18, 452.55
See application file for complete search history.

(56) References Cited

U.S. PATENT DOCUMENTS

| 4,350,390 | A | 9/1982 | Ogawa |
| 7,083,230 | B2 * | 8/2006 | Kull et al. .................. 297/216.1 |
| 8,539,661 | B2 * | 9/2013 | Gross et al. ...................... 29/428 |
| 2004/0227389 | A1 * | 11/2004 | Yoshida .................. 297/452.18 |
| 2010/0141009 | A1 * | 6/2010 | Kirch et al. .............. 297/452.18 |
| 2010/0244538 | A1 | 9/2010 | Gross et al. |

FOREIGN PATENT DOCUMENTS

JP    2000-142197    5/2000

OTHER PUBLICATIONS

European Search Report dated Dec. 21, 2012 issued in corresponding European Application No. 12184425.2.
Office Action mailed Jan. 20, 2015 in corresponding JP Application No. 2011-206183.

* cited by examiner

*Primary Examiner* — Sarah B McPartlin
(74) *Attorney, Agent, or Firm* — Knobbe Martens Olson & Bear LLP

(57) ABSTRACT

A vehicle seat comprising a fastened member and a fastening member. The fastened member comprising a fastened member-side base section formed from metal, and a fastened member-side reinforcement section formed from fiber reinforced plastic (FRP), laminated in a sheet thickness direction over the whole of the fastened member-side base section so as to reinforce the fastened member-side base section. The fastening member comprising a fastening member-side base section formed from metal, and a fastening member-side reinforcement section formed from FRP, laminated in a sheet thickness direction over the whole of the fastening member-side base section so as to reinforce the fastening member-side base section. The fastening member is fastened to the fastened member by bringing the fastening member-side base section into contact with the fastened member-side base section.

5 Claims, 15 Drawing Sheets

FIG.6
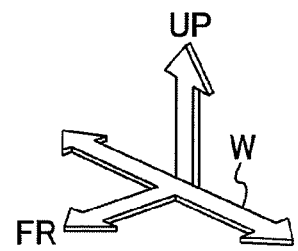
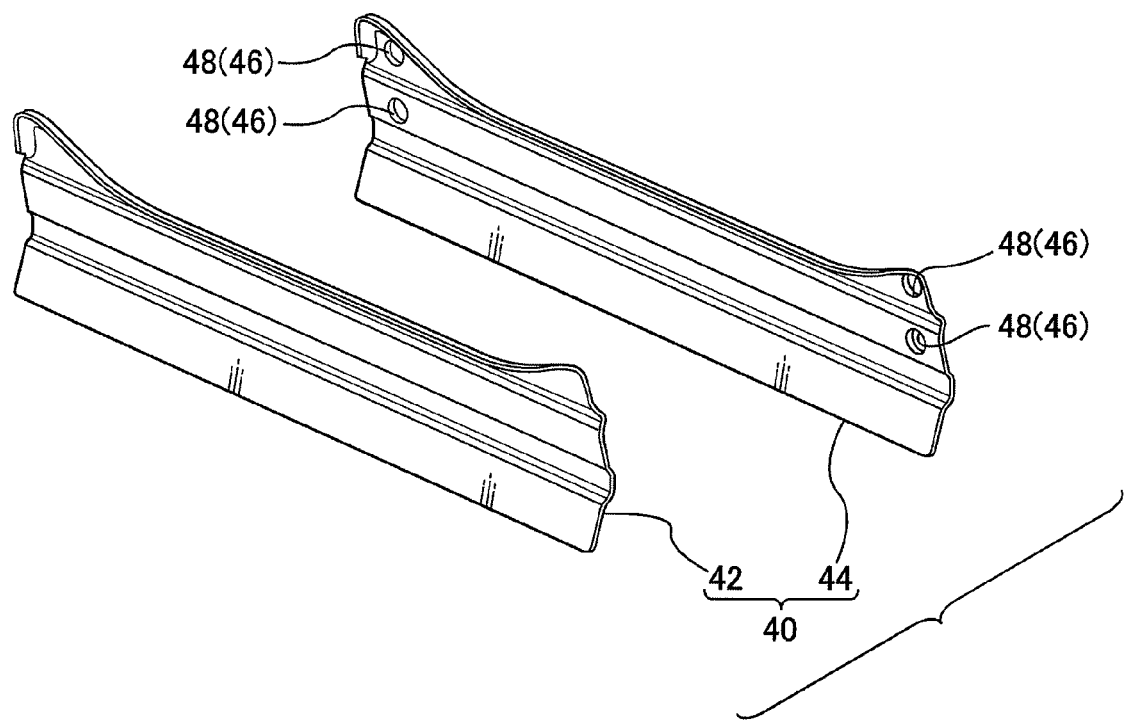

VEHICLE SEAT

CROSS-REFERENCE TO RELATED APPLICATION

This application claims priority under 35 USC 119 from Japanese Patent Application No. 2011-206183 filed on Sep. 21, 2011, the disclosure of which is incorporated by reference herein.

BACKGROUND OF THE INVENTION

1. Technical Field

The present invention relates to a vehicle seat equipped with a fastening member fastened to a fastened member.

2. Related Art

In a seat frame structure disclosed in Japanese Patent Application Laid-Open (JP-A) No. 2000-142197, a seatback-side bracket is fixed to a bottom end of a seatback frame, and wires are provided between the seatback frame and the seatback-side bracket. The wires accordingly act as reinforcement members and enable stress acting on the seatback frame to be alleviated. The diameter of the seatback frame can thereby be decreased, and hence a reduction in weight of the vehicle seat can be achieved.

However, in such a seat frame structure, the structure is complicated and the time required for assembly is increased due to providing the wires as new reinforcement members. In the vehicle seat, pads are also provided to the seatback frame and seat cushion, with the possibility arising of the wires cutting into the pads. There is therefore a need to further increase the number of components in order to protect the pad. The ability to reduce weight without changing the component configuration of a vehicle seat is therefore desired.

Research is ongoing into reducing the weight of a vehicle seat by forming configuration components of a vehicle seat from, for example, fiber reinforced plastic (FRP), a composite material formed from reinforcement fibers and resin.

In such cases it is possible to employ adhesive to connect together configuration components formed from FRP when fastening the components together. However in such cases, time is required for the adhesive to cure. An issue of deteriorating productivity hence arises due to the increase in assembly time incurred.

SUMMARY

In consideration of the above circumstances, a subject of the present invention is to provide a vehicle seat capable of reducing weight while still securing productivity.

A first aspect of the present invention is a vehicle seat equipped with: a fastened member configured including a fastened member-side base section formed from metal, and a fastened member-side reinforcement section formed from fiber reinforced plastic (FRP), laminated in a sheet thickness direction over the whole of the fastened member-side base section so as to reinforce the fastened member-side base section; and a fastening member configured including a fastening member-side base section formed from metal, and a fastening member-side reinforcement section formed from FRP, laminated in a sheet thickness direction over the whole of the fastening member-side base section so as to reinforce the fastening member-side base section, wherein the fastening member is fastened to the fastened member by bringing the fastening member-side base section into contact with the fastened member-side base section.

In the vehicle seat of the first aspect, the fastened member is configured including the fastened member-side base section formed from metal, and the fastened member-side reinforcement section formed from fiber reinforced plastic (FRP, a composite material formed from reinforcement fibers and resin). The fastened member-side reinforcement section is laminated in the sheet thickness direction over the whole of the fastened member-side base section so as to reinforce the fastened member-side base section. The sheet thickness of the fastened member-side base section can thereby be made thinner, and a reduction in weight of the fastened member can be achieved.

The fastening member is configured including the fastening member-side base section formed from metal, and the fastening member-side reinforcement section formed from FRP. The fastening member-side reinforcement section is laminated in the sheet thickness direction over the whole of the fastening member-side base section so as to reinforce the fastening member-side base section. The sheet thickness of the fastening member-side base section can accordingly be made thinner, enabling a reduction in weight of the fastening member to be achieved.

The fastening member here is fastened to the fastened member in a state in which the fastening member-side base section is in contact with the fastened member-side base section. This thereby enables, for example, the fastening member to be fastened to the fastened member by welding. Therefore the assembly time (fastening time) can be shortened when fastening the fastening member to the fastened member in comparison to when the fastening member is fastened to the fastened member by adhesive alone.

A vehicle seat of a second aspect of the present invention is the vehicle seat of the first aspect, wherein an exposed portion is provided at the fastened member-side reinforcement section and/or the fastening member-side reinforcement section so as to expose a portion of the fastened member-side base section and/or the fastening member-side base section.

In the vehicle seat of the second aspect, the exposed portion is provided at the fastened member-side reinforcement section and/or the fastening member-side reinforcement section, and hence a portion of the fastened member-side base section and/or the fastening member-side base section can be exposed by the exposed portion. Hence when the fastened member-side base section and the fastening member-side base section are disposed facing each other, the fastening member can be fastened to the fastened member with welding by, for example, disposing an electrode of a welding apparatus at the exposed portion.

A vehicle seat of a third aspect of the present invention is the vehicle seat of the second aspect, wherein a projection portion is provided at the fastened member-side base section and/or the fastening member-side base section, projecting out towards a exposed portion side and disposed inside the exposed portion.

In the vehicle seat of the third aspect, the projection portion is provided at the fastened member-side base section and/or the fastening member-side base section, and the projection portion projects out towards the exposed portion side and is disposed inside the exposed portion. Hence when, for example, the fastening member-side base section and the fastened member-side reinforcement section are disposed facing each other, the projection portion and the fastening member-side base section can be placed in contact with each other due to provision of the projection portion on the fastened member-side base section. The fastened member-side base section and the fastening member-side base section can thereby be fastened together by welding.

A vehicle seat of a fourth aspect of the present invention is a vehicle seat of the second aspect or the third aspect, wherein at a fastening location of the fastened member and the fastening member, an adhesive is interposed between the fastened member-side base section and the fastening member-side base section and the fastened member and the fastening member are also fastened by welding.

In the vehicle seat of the fourth aspect, at the fastening location where the fastening member is fastened to the fastening member, the adhesive is interposed between the fastening member-side base section and the fastened member-side base section and the fastened member and the fastening member are also fastened by welding. The fastening member is accordingly fastened to the fastened member using a combination of fastening by adhesive and fastening by welding, resulting in raised strength and rigidity of the fastened portion between the fastening member and the fastened member. However, the fastened member and the fastening member may still be conveyed to the next process without waiting a time for the adhesive to cure. Increase in the assembly time can thereby be suppressed.

According to the vehicle seat of the first aspect, a reduction in weight can be achieved while still securing productivity.

According to the vehicle seat of the second aspect, the exposed portion is employed and the fastening member and the fastened member can be fastened together by welding.

According to the vehicle seat of the third aspect, the exposed portion is employed and the fastening member-side base section and the fastened member-side base section can be brought in contact with each other and fastened together.

The vehicle seat of the fourth aspect enables the strength and rigidity of the fastening location of the fastening member and the fastened member to be raised.

BRIEF DESCRIPTION OF THE DRAWINGS

Exemplary embodiments of the present invention will be described in detail based on the following figures, wherein:

FIG. 6 is an exploded perspective view of the lower panel employed in the seatback frame illustrated in FIG. 2;

DETAILED DESCRIPTION OF THE INVENTION

Figure 2:
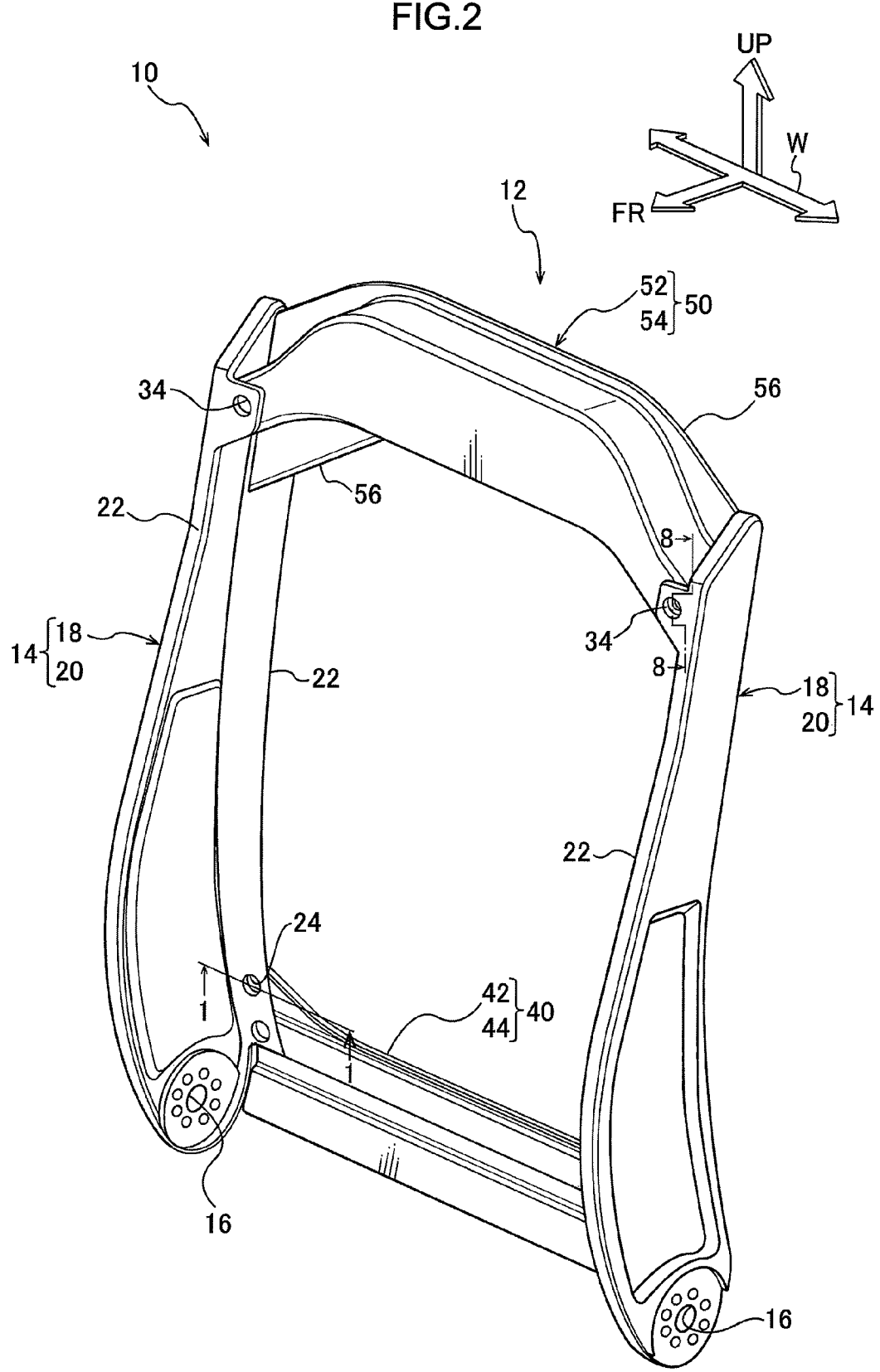
FIG. 2 is a perspective view illustrating a seatback frame of a vehicle seat according to an exemplary embodiment of the present invention.

FIG. 2 is an overall perspective view illustrating a seatback frame 12 employed in a vehicle seat 10 according to an exemplary embodiment of the present invention, as viewed diagonally from a sea front. Note that in the drawings, an arrow FR indicates a seat front direction, an arrow W indicates a seat width direction, and an arrow UP indicates upwards, as appropriate.

As shown in FIG. 2, the vehicle seat 10 is equipped with the seatback frame 12. The vehicle seat 10 is equipped with a seat cushion (not shown in the drawings) for an occupant to sit on, and a cushion frame (not shown in the drawings) is provided inside the seat cushion. The cushion frame is connected to a vehicle body floor, and the seatback frame 12 is supported at a seat rear direction end portion of the cushion frame so as to be capable of reclining.

The seatback frame 12 includes a pair of side frames 14 serving as fastened members, a lower panel 40 serving as a fastening member, and an upper cross-member 50 serving as a fastening member.

The pair of side frames 14 are each provided at the respective seat width direction two end portions of the seatback frame 12, formed in a substantially plate shape running lengthwise along the top-bottom direction. A circular shaped attachment hole 16 is formed through a lower portion of each of the side frames 14, and a known reclining mechanism is attached to the attachment holes 16. The seatback frame 12 is thereby supported by the seat cushion frame so as to be capable of reclining.

Figure 1:
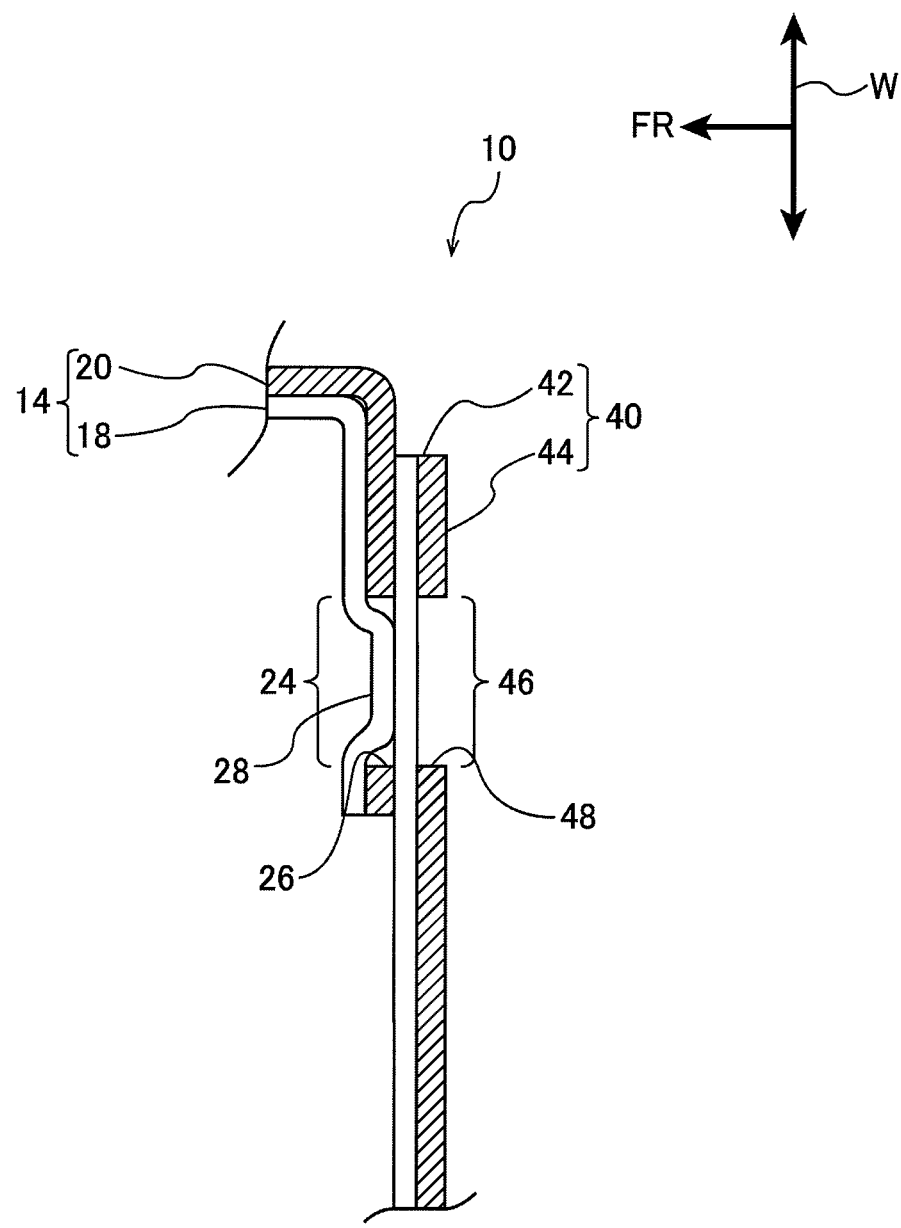
FIG. 1 is a cross-section (a cross-section taken on line 1-1 of FIG. 2) illustrating a fastened state of a side frame and a lower panel employed in a seatback frame of a vehicle seat according to an exemplary embodiment of the present invention.
Figure 3:
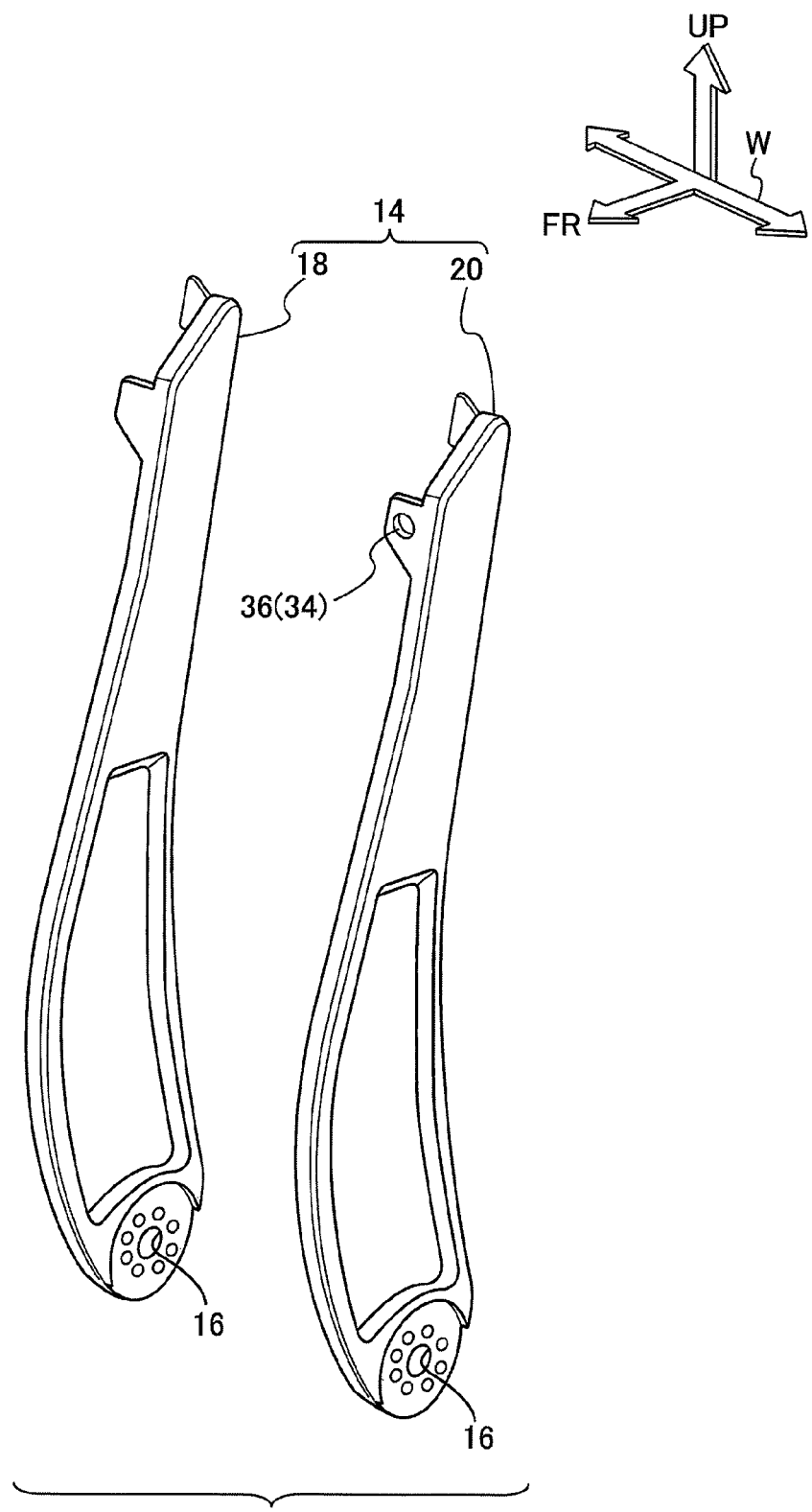
FIG. 3 is an exploded perspective view of the side frame employed in the seatback frame illustrated in FIG. 2.

As shown in FIG. 1 and FIG. 3, each of the side frames 14 is configured including a side frame base section 18 serving as a fastened member-side base section, and a side frame reinforcement section 20 serving as a fastened member-side reinforcement section (only the side frame 14 disposed at the seat left hand side portion of the seatback frame 12 (a seat width direction side) is shown in FIG. 3). The side frame base section 18 is formed by press-forming from high tensile sheet steel (having, for example, a sheet thickness of 0.5 mm and a tensile strength of an order of 590 MPa). The side frame reinforcement section 20 is formed from carbon fiber reinforced plastic (CFRP, a composite material of carbon fiber and resin). The side frame reinforcement section 20 and the side frame base section 18 are integrally formed by disposing the side frame reinforcement section 20 on the seat width direction outside of the side frame base section 18 and laminating in the sheet thickness direction over the whole of the side frame base section 18. The side frame base section 18 is thereby configured at the seat width direction inside portion of the side frame 14 and the side frame reinforcement section 20 is configured at the seat width direction outside portion of the side frame 14.

When thus integrally forming the side frame base section 18 and the side frame reinforcement section 20, an adhesive is interposed between the side frame base section 18 and the side frame reinforcement section 20. The side frame base section 18 and the side frame reinforcement section 20 are then integrally formed by pressing both sections together and bonding together with the adhesive.

Note that the method for integrally forming the side frame base section 18 and the side frame reinforcement section 20 is not limited thereto. For example, the side frame base section 18 and the side frame reinforcement section 20 may be integrally formed by any of the following methods. The side frame reinforcement section 20 may be formed from a composite material of carbon reinforcement fibers and a thermoplastic resin (for example polypropylene) and may be heated and melt. The side frame reinforcement section 20 and the side frame base section 18 may then be integrally formed.

The side frames 14 may also be integrally formed by placing a preform (carbon reinforcement fibers molded into a three-dimensional shape) and the side frame base section 18 in a mold. The side frame base section 18 and the side frame reinforcement section 20 may then be integrally formed by pouring a molten thermosetting resin into the mold. The side frame base section 18 and the side frame reinforcement section 20 can also be formed by autoclave molding using a prepreg.

As shown in FIG. 2, flanges 22 are integrally formed around the whole of the outer peripheral portion of the side frames 14, with the flanges 22 bending around from the side frames 14 towards the seat width direction inside.

Figure 4:
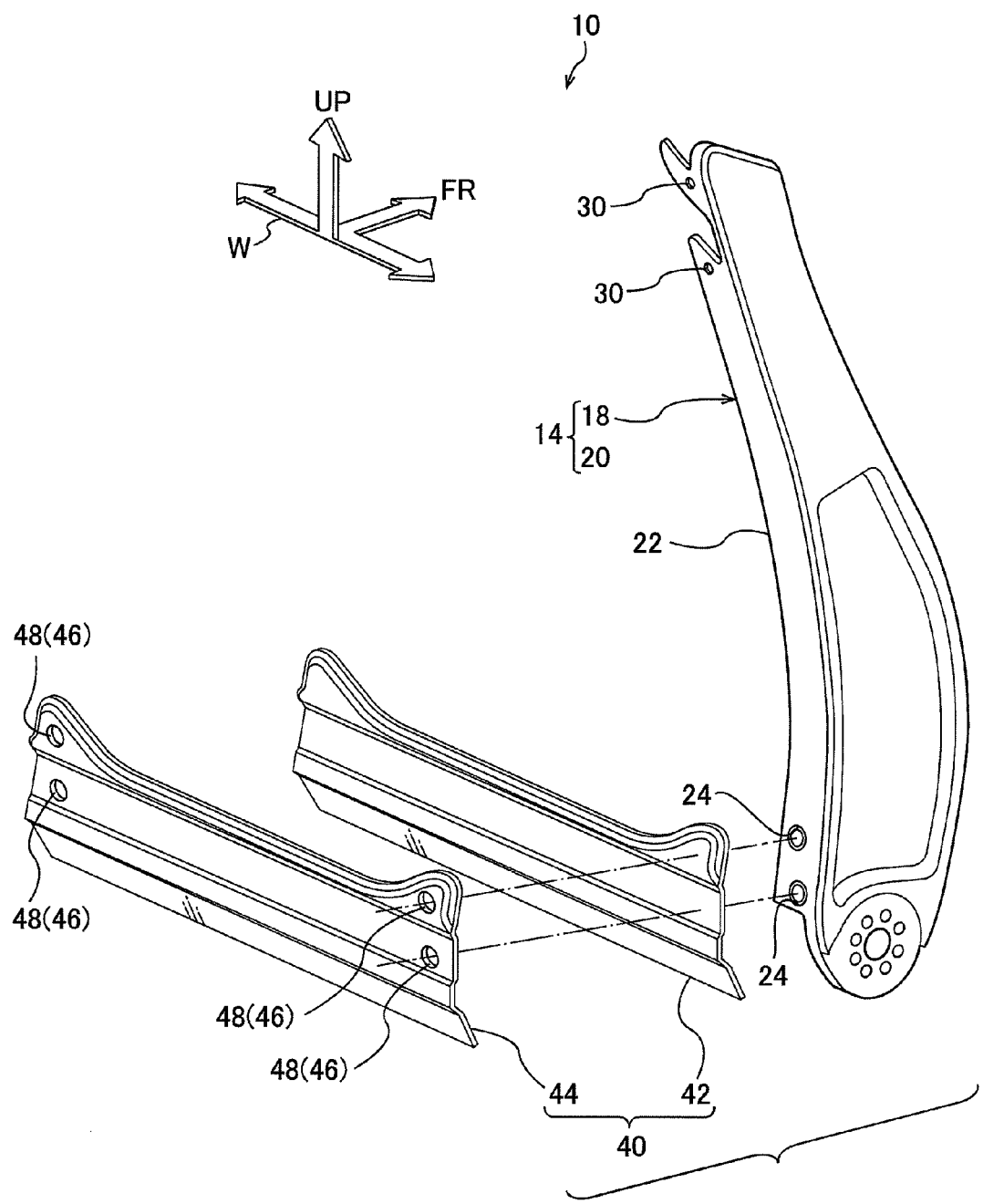
FIG. 4 is a perspective view illustrating an exploded state of the side frame and the lower panel employed in the seatback frame illustrated in FIG. 2, as seen diagonally from the seat rear.
Figure 5:
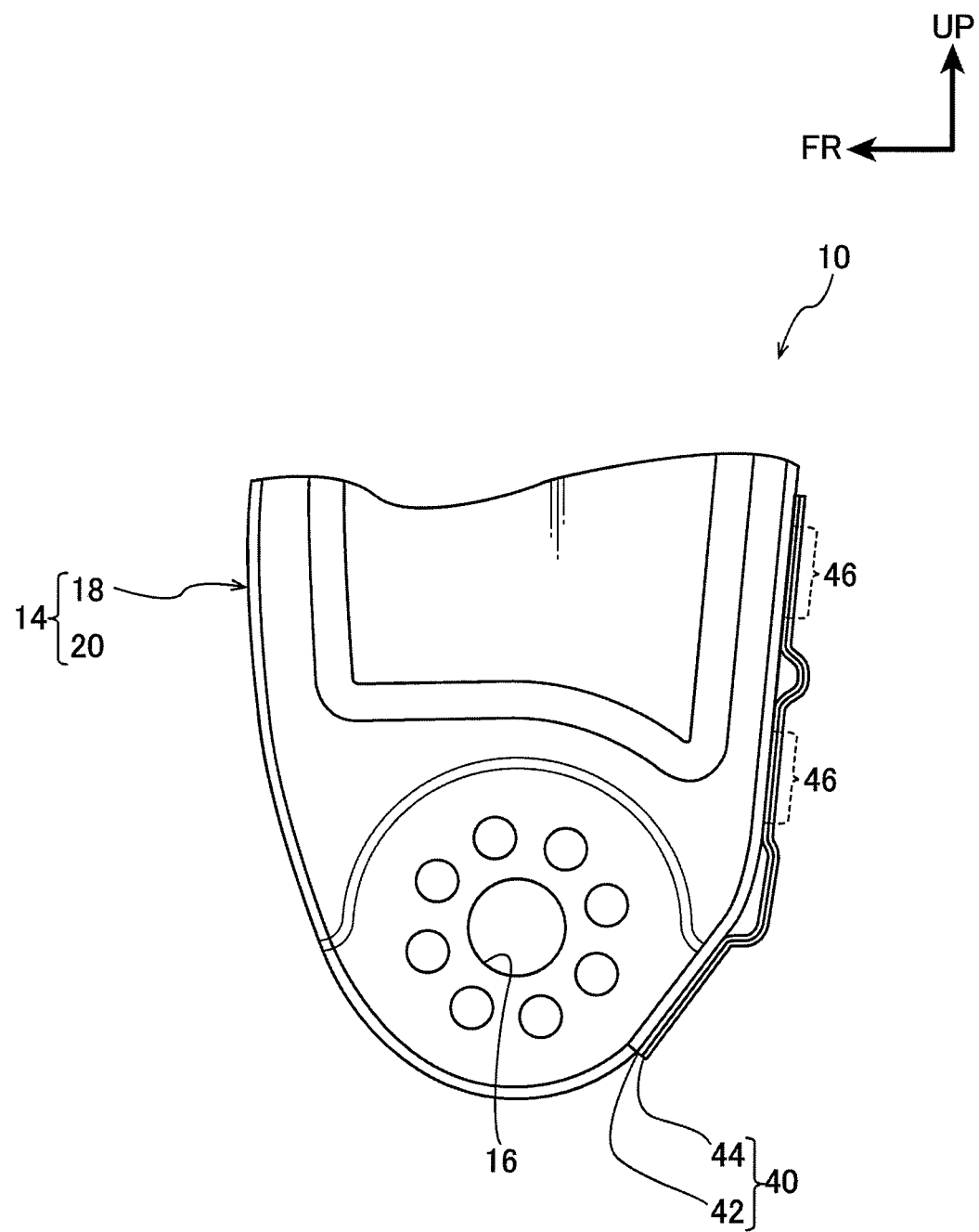
FIG. 5 is a side view from the seat width direction outside illustrating a lower portion of the seatback frame of FIG. 2.

As shown in FIG. 4, a pair of first side frame weld portions 24 are formed at a lower portion of the seat rear direction portion of each of the flanges 22 (only the side frame 14 disposed at the seat right hand side portion of the seatback frame 12 (the other seat width direction side) is shown in FIG. 4). As shown in FIG. 1, circular shaped placement holes 26 serving as exposed portions are formed through the side frame reinforcement section 20 at locations of the first side frame weld portions 24. Protrusion portions 28 that serve as projection portions, and are circular shaped as viewed from the seat rear direction, are also formed at the side frame base sections 18 at the locations of the first side frame weld portions 24. The protrusion portions 28 project out from the side frame base sections 18 towards the respective side frame reinforcement section 20 side (the seat rear direction). The protrusion portions 28 are disposed inside the placement holes 26, such that the seat rear direction face of the protrusion portions 28 is in a same plane as the seat rear direction face of the side frame reinforcement section 20. Note that in FIG. 1, hatching of the side frame base section 18 and a lower panel base section 42, described later, is omitted for convenience of understanding.

Figure 8:
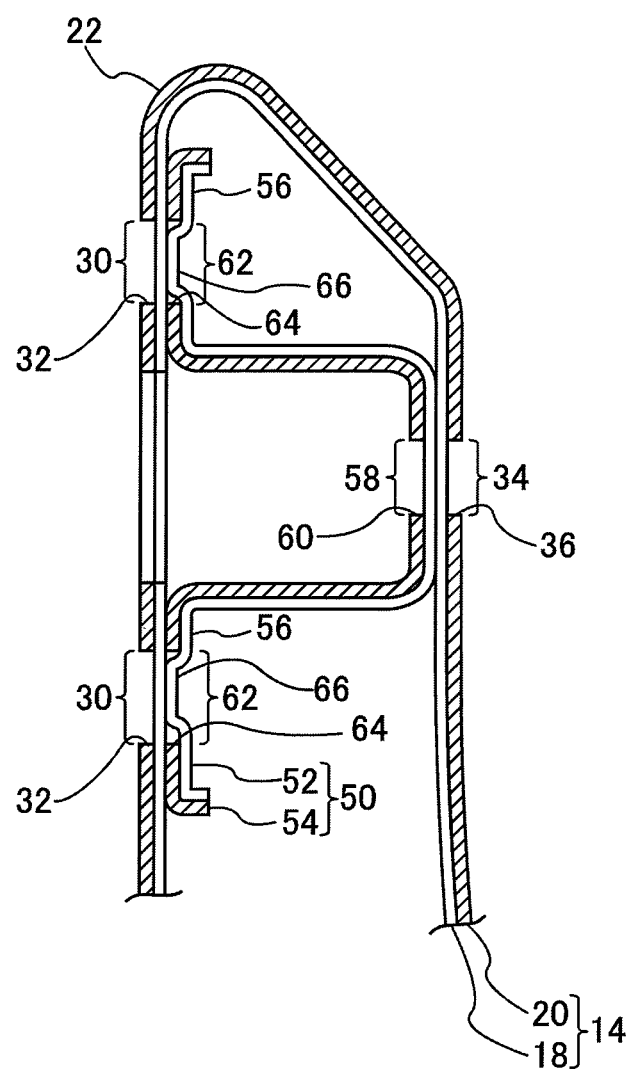
FIG. 8 is a cross-section (a cross-section taken on line 8-8 of FIG. 2) illustrating a fastened state of the side frame and the upper cross-member illustrated in FIG. 2.

As shown in FIG. 4, pairs of second side frame weld portions 30 are also provided at upper portions of the seat rear direction portions of the flanges 22 of the respective side frames 14. As shown in FIG. 8, circular shaped placement holes 32 serving as exposed portions are formed through the side frame reinforcement sections 20 at locations of the second side frame weld portions 30. The second side frame weld portions 30 accordingly form an indented shape opening towards the seat rear direction, such that the side frame base section 18 is exposed at the placement holes 32. Note that in FIG. 8 hatching of the side frame base section 18 and an upper cross-member base section 52, described later, is omitted for convenience of understanding.

As shown in FIG. 2, third side frame weld portions 34 are provided at an upper portion of the seat front direction portion of the flanges 22. As shown in FIG. 8, circular shaped placement holes 36 serving as exposed portions are formed through the side frame reinforcement sections 20 at locations of the third side frame weld portions 34. The third side frame weld portions 34 accordingly form an indented shape opening towards the seat front direction, such that the side frame base sections 18 are exposed at the placement holes 36. The side frame reinforcement sections 20 are accordingly laminated in the sheet thickness direction over the whole of the side frame base sections 18, excluding the first side frame weld portions 24, the second side frame weld portions 30 and the third side frame weld portions 34. Therefore, reference above to the "the whole of the side frame base section 18 laminated over by the side frame reinforcement sections 20" indicates the portions of the side frame base sections 18 excluding the locations of the first side frame weld portions 24, the second side frame weld portions 30 and the third side frame weld portions 34.

As shown in FIG. 2, the lower panel 40 is provided at seat rear direction lower portion of the side frame 14. The lower panel 40 is formed in a substantially plate shape extending along the seat width direction so as to span between the pair of side frames 14. As shown in FIG. 4 and FIG. 6, the lower panel 40 is configured from a lower panel base section 42 serving as a fastening member-side base section and a lower panel reinforcement section 44 serving as a fastening member-side reinforcement section. The lower panel base section 42 is formed by press forming from high tensile sheet steel (having, for example, a sheet thickness of 0.5 mm and a tensile strength of an order of 590 MPa). The lower panel reinforcement section 44 is formed from CFRP. The lower panel reinforcement section 44 is disposed at a seat rear side of the lower panel base section 42 and is laminated in a thickness direction over the whole of the lower panel base section 42, such that the lower panel reinforcement section 44 and the lower panel base section 42 are integrally formed. The lower panel base section 42 accordingly configures a seat front direction portion of the lower panel 40, and the lower panel reinforcement section 44 configures a seat rear direction portion of the lower panel 40. Note that the lower panel base section 42 and the lower panel reinforcement section 44 may be integrally formed by a similar method to the methods for integrally forming the side frame base sections 18 and the side frame reinforcement sections 20.

A pair of lower panel weld portions 46 are provided at two respective seat width direction end portions of the lower panel 40. The lower panel weld portions 46 are disposed to face the locations of the first side frame weld portions 24. As shown in FIG. 1, circular shaped placement holes 48 serving as exposed portions are formed through the lower panel reinforcement section 44 at locations of the lower panel weld portions 46. The lower panel weld portions 46 accordingly form an indented shape opening towards the seat rear direction, such that the lower panel base section 42 is exposed at the placement holes 48. The lower panel reinforcement section 44 is thereby laminated in the plate thickness direction over the whole of the lower panel base section 42 excluding the locations of the lower panel weld portions 46. Therefore, reference above to the "whole of the lower panel base section 42 laminated over by the lower panel reinforcement section 44" indicates the portions of the lower panel base section 42 excluding the locations of the lower panel weld portions 46.

The lower panel base section 42 at the lower panel weld portions 46 and the protrusion portions 28 of the side frame base sections 18 at the first side frame weld portions 24 are then placed in contact with each other and resistance welded.

Figure 7:
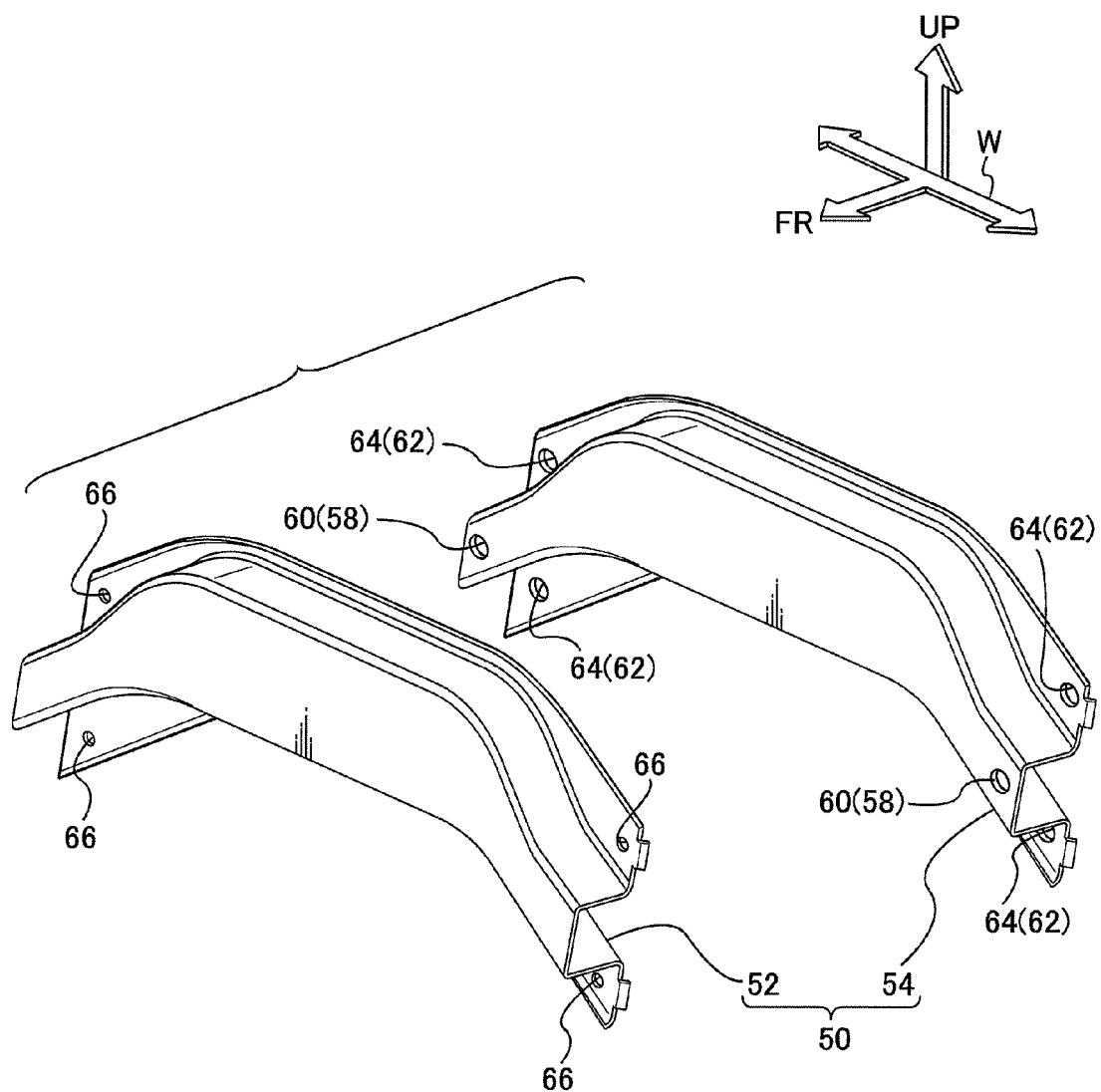
FIG. 7 is an exploded perspective view of the upper cross-member employed in the seatback frame illustrated in FIG. 2.

As shown in FIG. 2, the upper cross-member 50 is provided between upper portions of the pair of side frames 14. The upper cross-member 50 is formed extending along the seat width direction so as to span between the pair of side frames 14. As shown in FIG. 7, the upper cross-member 50 is configured with the upper cross-member base section 52 serving as a fastening member-side base section and an upper cross-member reinforcement section 54 serving as a fastening member-side reinforcement section. The upper cross-member base section 52 is formed by press-forming from high tensile sheet steel (having, for example, a sheet thickness of 0.5 mm and a tensile strength of an order of 590 MPa). The upper cross-member reinforcement section 54 is formed from CFRP. The upper cross-member reinforcement section 54 is disposed at the seat rear direction of the upper cross-member base section 52. The upper cross-member reinforcement section 54 is laminated in the sheet thickness direction over the whole of the upper cross-member base section 52, such that the upper cross-member reinforcement section 54 and the upper cross-member base section 52 are integrally formed. The upper cross-member base section 52 accordingly configures a seat front direction portion of the upper cross-member 50 and the upper cross-member reinforcement section 54 configures a seat rear direction portion of the upper cross-member 50. Note that the upper cross-member base section 52 and the upper cross-member reinforcement section 54 may be integrally formed by a similar method to the methods for integrally forming the side frame base sections 18 and the side frame reinforcement sections 20.

As shown in FIG. 8, the upper cross-member 50 is formed with a substantially backwards-C-shape as viewed from the side, opening towards the vehicle rear direction. Respective flanges 56 are provided to the open portion of the upper cross-member 50, and the flanges 56 extend out from the open portion of the upper cross-member 50 in directions to separate from each other (top-bottom directions).

Respective first upper cross-member weld portions 58 are provided at seat front direction portions of the two seat width direction end portions of the upper cross-member 50. The first upper cross-member weld portions 58 are disposed at locations facing the third side frame weld portions 34 of the side frame 14. Circular shaped placement holes 60 serving as exposed portions are formed through the upper cross-member reinforcement section 54 at the first upper cross-member weld portions 58. The first upper cross-member weld portions 58 accordingly form an indented shape opening towards the seat rear direction, with the upper cross-member base section 52 exposed at the placement holes 60.

The upper cross-member base section 52 at the first upper cross-member weld portions 58 and the side frame base sections 18 at the third side frame weld portions 34 are then placed in contact with each other and resistance welded.

Respective pairs of second upper cross-member weld portions 62 are provided at the two seat width direction end portions of the flanges 56 of the upper cross-member 50. The second upper cross-member weld portions 62 are disposed facing the second side frame weld portions 30 of the side frame 14. Circular shaped placement holes 64 serving as exposed portions are formed through the upper cross-member reinforcement section 54 at the locations of the second upper cross-member weld portions 62. Protrusion portions 66 that serve as projection portions and are circular shaped when viewed from the seat rear direction are formed at the upper cross-member base section 52 at the locations of the second upper cross-member weld portions 62. The protrusion portions 66 project out from the upper cross-member base section 52 towards the upper cross-member reinforcement section 54 side (the seat rear direction). The protrusion portions 66 are disposed inside the placement holes 64 such that the seat rear direction faces of the protrusion portions 66 are in the same plane as the seat rear direction faces of the upper cross-member reinforcement section 54. The upper cross-member reinforcement section 54 is accordingly laminated in the sheet thickness direction over the whole of the upper cross-member base section 52 excluding the locations of the first upper cross-member weld portions 58 and the second upper cross-member weld portions 62. Hence reference above to the "whole of the upper cross-member base section 52 laminated over by the upper cross-member reinforcement section 54" indicates the portions of the upper cross-member base section 52 excluding the locations of the first upper cross-member weld portions 58 and the second upper cross-member weld portions 62.

The protrusion portions 66 of the upper cross-member base section 52 at the second upper cross-member weld portions 62 and the side frame base sections 18 at the second side frame weld portions 30 are then placed in contact with each other and resistance welded.

Explanation follows regarding the operation and advantageous effects of the present invention while giving a brief explanation of the sequence employed for fastening the lower panel 40 and the upper cross-member 50 to the pair of side frames 14.

Explanation first follows regarding the sequence of fastening the lower panel 40 to the side frames 14. For this, as shown in FIG. 1, the lower panel weld portions 46 of the lower panel 40 are aligned facing the first side frame weld portions 24 of the side frame 14, and the lower panel 40 is disposed to the seat rear direction of the pair of side frames 14. The seat rear direction face of the protrusion portions 28 of the first side frame weld portions 24 and the seat front direction face of the lower panel base section 42 at the lower panel weld portions 46 are then placed in contact with each other. In this state, a fixed electrode of a resistance welding apparatus is disposed at the seat front direction side of each of the protrusion portions 28 of the first side frame weld portion 24 and the fixed electrode brought into contact with the seat front direction face of the protrusion portions 28. A movable electrode of the resistance welding apparatus is then disposed inside each of the placement holes 48 at the lower panel weld portions 46, the movable electrode is brought into contact the seat rear direction face of the lower panel base section 42, and the lower panel base section 42 and the side frame base sections 18 are resistance welded together. The lower panel weld portions 46 are accordingly fastened to the first side frame weld portions 24, fastening the lower panel 40 to the side frames 14.

Explanation follows regarding a sequence for fastening the upper cross-member 50 to the side frame 14. In such cases, as shown in FIG. 8, the first upper cross-member weld portions 58 of the upper cross-member 50 are aligned facing the third side frame weld portions 34 of the side frames 14, and the pairs of second upper cross-member weld portions 62 of the upper cross-member 50 are aligned facing the pairs of second side frame weld portions 30 of the side frames 14, with the upper cross-member 50 disposed between upper portions of the pair of side frames 14.

Then the seat rear direction faces of the side frame base sections 18 at the third side frame weld portions 34 and the seat front direction face of the upper cross-member base section 52 at the first upper cross-member weld portions 58 are placed in contact with each other, and the seat front direction face of the side frame base sections 18 and the seat rear direction face of the protrusion portions 66 of the second upper cross-member weld portions 62 are placed in contact with each other. In this state, a fixed electrode of a resistance welding apparatus is disposed inside each of the placement holes 60 of the first upper cross-member weld portions 58, and the fixed electrode is brought into contact the seat rear direction face of the upper cross-member base section 52. A movable electrode of the resistance welding apparatus is also disposed inside each of the placement holes 36 at the third side frame weld portions 34, the movable electrode is brought into contact with the seat front direction face of the side frame base sections 18, and the side frame base sections 18 and the upper cross-member base section 52 are resistance welded together. The first upper cross-member weld portions 58 are thus fastened to the third side frame weld portions 34.

A fixed electrode of the resistance welding apparatus is also disposed at the seat front direction side of each of the protrusion portions 66 of the second upper cross-member weld portions 62 and the fixed electrode brought into contact with the seat front direction face of the protrusion portions 66. A movable electrode of the resistance welding apparatus is also disposed inside the placement holes 32 of each of the second side frame weld portions 30, the movable electrode is brought into contact with the seat rear direction face of the side frame base sections 18, and the side frame base sections 18 and the upper cross-member base section 52 are resistance welded together. The second upper cross-member weld portions 62 are thus fastened to the second side frame weld portions 30. The upper cross-member 50 is thus fastened to the side frames 14.

As stated above, the lower panel 40 and the upper cross-member 50 are fastened to the side frames 14 with the lower panel base section 42 and the upper cross-member base section 52 that are formed from high tensile sheet steel in a state of contact with the side frame base sections 18 that are also formed from high tensile sheet steel. The lower panel 40 and the upper cross-member 50 can thus be fastened to the side frames 14 by welding. However, consider a case in which the lower panel 40 and the upper cross-member 50 are only fastened to the side frames 14 by adhesive. In such a case time is required for the adhesive to cure. Therefore the assembly time (the fastening time) to fasten the lower panel 40 and the upper cross-member 50 to the side frames 14 can be shortened.

The CFRP-formed side frame reinforcement sections 20, lower panel reinforcement section 44 and upper cross-member reinforcement section 54 in the side frames 14, the lower panel 40 and the upper cross-member 50 are respectively laminated in the sheet thickness direction over the whole of the high tensile sheet steel-formed side frame base sections 18, lower panel base section 42 and upper cross-member base section 52. The side frame reinforcement sections 20, the lower panel reinforcement section 44 and the upper cross-member reinforcement section 54 thus reinforce the side frame base sections 18, the lower panel base section 42 and the upper cross-member base section 52, respectively. The members of the side frames 14, the lower panel 40 and the upper cross-member 50 can accordingly be made lighter while still securing the strength of these members. For example, the side frames 14 configured from the side frame reinforcement sections 20 (sheet thickness 0.5 mm) and the side frame base sections 18 (of high tensile sheet steel with sheet thickness 0.5 mm and tensile strength of the order of 590 MPa) can be imparted with equivalent strength to side frames configured solely by the side frame base sections 18 (high tensile sheet steel with sheet thickness 1 mm and tensile strength of the order of 980 MPa).

The vehicle seat 10 can accordingly be made lighter while still securing productivity.

The placement holes 36 are provided in the side frames 14 and the placement holes 60 are provided in the upper cross-member 50. The upper cross-member 50 and the side frames 14 can thereby be fastened by resistance welding by disposing the movable electrode of a resistance welding apparatus inside each of the placement holes 36 and disposing the fixed electrode of the resistance welding apparatus inside each of the placement holes 60. The upper cross-member 50 can therefore be resistance welded to the side frames 14 by utilizing the placement holes 36, 60.

The placement holes 26 are also provided in the side frames 14 and the protrusion portions 28 of the side frame base sections 18 are disposed inside the placement holes 26, such that the protrusion portions 28 are in contact with the lower panel base section 42. The side frame base sections 18 can thereby be placed in contact with the lower panel base section 42 by utilizing the placement holes 26, enabling the lower panel 40 to be fastened to the side frames 14 by resistance welding.

Figure 9:
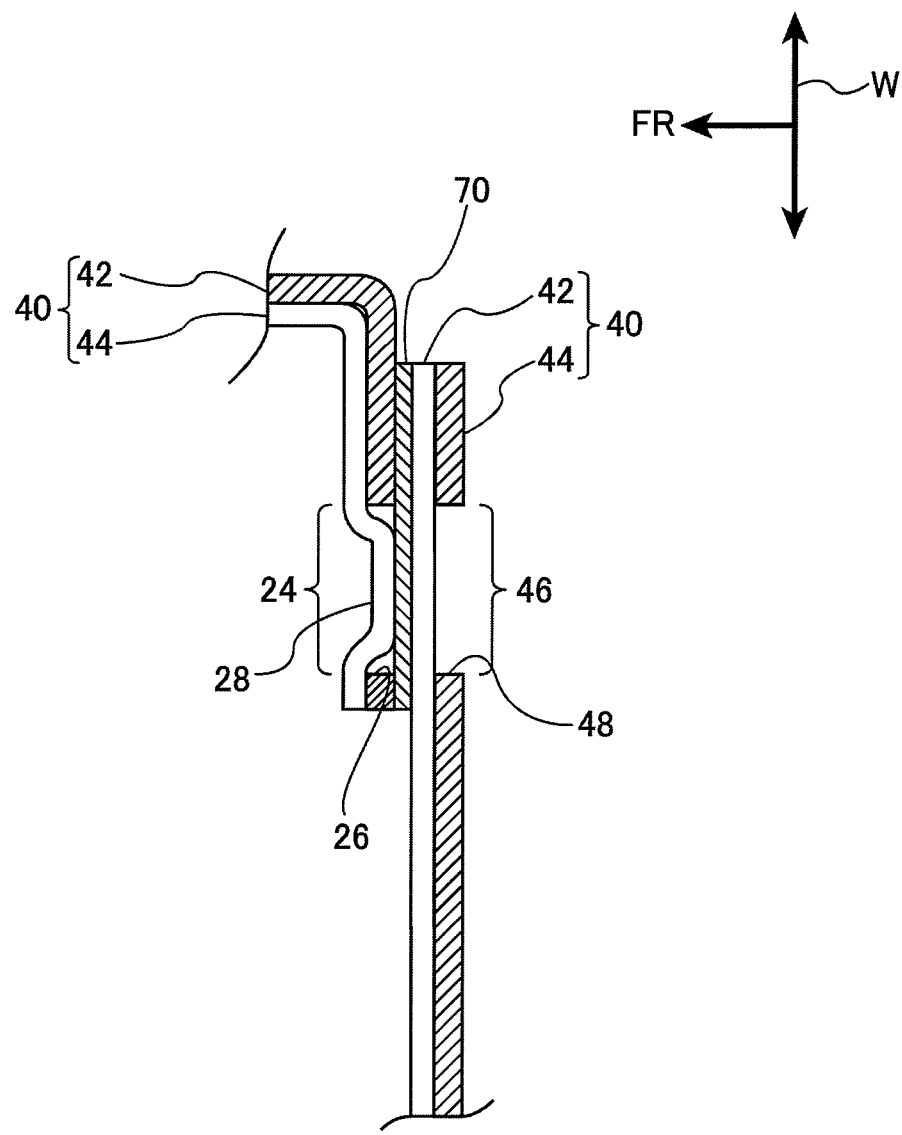
FIG. 9 is a cross-section illustrating a fastened state of a side frame and a lower panel employed in a seatback frame of a vehicle seat according to an exemplary embodiment of the present invention.

Note that in the present exemplary embodiment, the protrusion portions 28 at the first side frame weld portions 24 and the lower panel base section 42 at the lower panel weld portions 46 are in contact with each other. However, as an alternative, as shown in FIG. 9, a weld bond 70 serving as an adhesive may be interposed between the protrusion portions 28 of the first side frame weld portions 24 and the lower panel base section 42 at the lower panel weld portions 46. In such cases the weld bond 70 is configured by a bonding agent (adhesive) that allows welding to be performed between the protrusion portions 28 and the lower panel base section 42.

The strength and rigidity of fastening portions between the protrusion portions 28 at the first side frame weld portions 24 and the lower panel base section 42 at the lower panel weld portions 46 can accordingly be raised, enabling the fastening strength between the side frames 14 and the lower panel 40 to be raised. However, since the lower panel 40 is fastened to the side frames 14 by employing a combination of fastening with the weld bond 70 and fastening with welding, the side frames 14 and the lower panel 40 can be conveyed to the next process without having to wait till the end of the curing time for the weld bond 70. Hence the productivity of the vehicle seat 10 can be secured since an increase in the assembly time can be suppressed even when the side frame base sections 18 and the lower panel base section 42 are fastened by the weld bond 70. Furthermore, the vibration resistance is raised and the ride comfort of the vehicle seat 10 can be raised due to the weld bond 70 raising the bonding rigidity by the weld bond 70 being interposed between the side frame base sections 18 and the lower panel base section 42.

Figure 10:
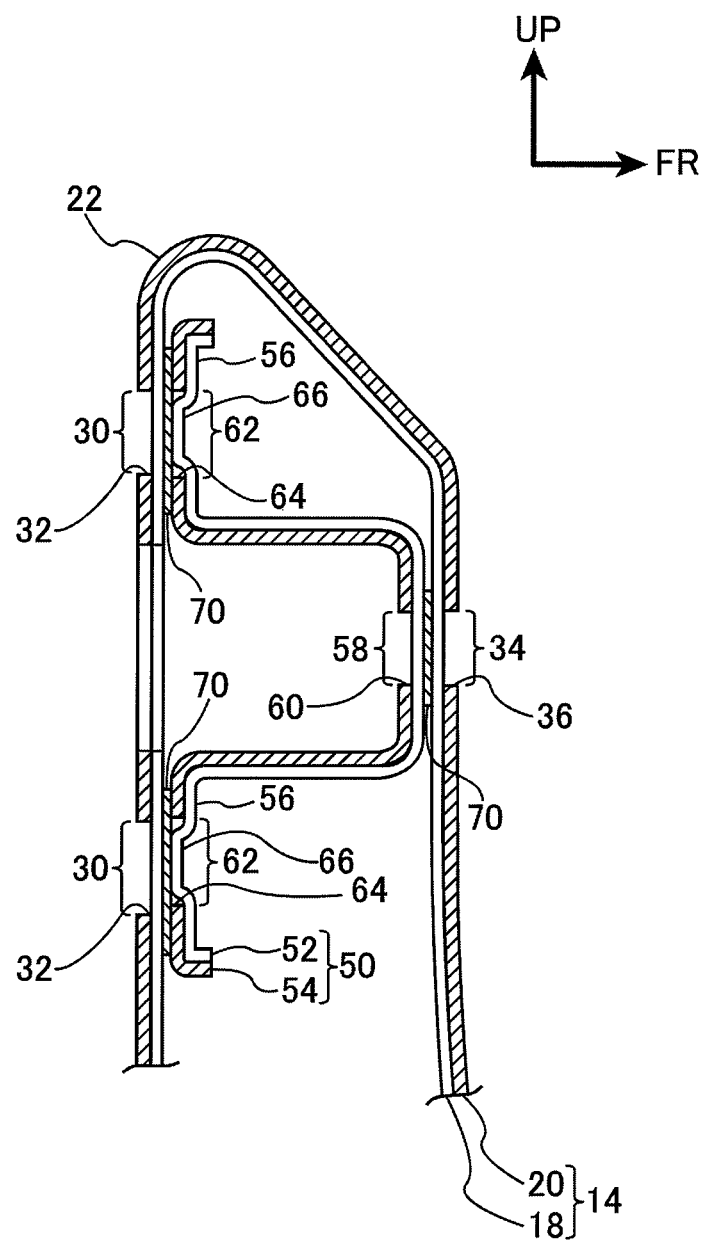
FIG. 10 is a cross-section illustrating a fastened state of a side frame and an upper cross-member employed in a seatback frame of a vehicle seat according to an exemplary embodiment of the present invention.

Furthermore, in such cases, as shown in FIG. 10, the weld bond 70 may also be interposed between the side frame base sections 18 at the second side frame weld portions 30 and the protrusion portions 66 at the second upper cross-member weld portions 62. The weld bond 70 may also be interposed between the side frame base sections 18 at the third side frame weld portions 34 and the upper cross-member base section 52 at the first upper cross-member weld portions 58.

In the present exemplary embodiment, the lower panel 40 and the upper cross-member 50 are fastened to the side frames 14 by resistance welding and as an example the side frame base sections 18 at each of the third side frame weld portions 34 and the upper cross-member base section 52 at each of the first upper cross-member weld portions 58 are sandwiched between respective fixed electrodes and movable electrodes of a resistance welding apparatus and welded. However alternatively, both the fixed electrode and the movable electrode of the resistance welding apparatus may be disposed inside each of the placement holes 36 at the third side frame weld portions 34, and the side frame base sections 18 and the upper cross-member base section 52 resistance welded together. The placement holes 60 of the first upper cross-member weld portions 58 can thereby be omitted.

In the present exemplary embodiment the lower panel 40 and the upper cross-member 50 are fastened to the side frames 14 by resistance welding, however there is no limitation to the welding method employed to weld the lower panel 40 and the upper cross-member 50 to the side frames 14. For example, laser welding or spot welding may employ to fasten the lower panel 40 and the upper cross-member 50 to the side frames 14. In such cases, for example, a laser beam may be irradiated from the seat rear direction side onto the lower panel weld portions 46 and the lower panel base section 42 welded to the protrusion portions 28 at the first side frame weld portions 24. The lower panel 40 and the upper cross-member 50 may also, for example, be fastened to the side frames 14 by projection welding. In such cases, for example, the projection welding can be carried out by providing projection portions at the side frame base sections 18 of the first side frame weld portions 24.

Figure 11:
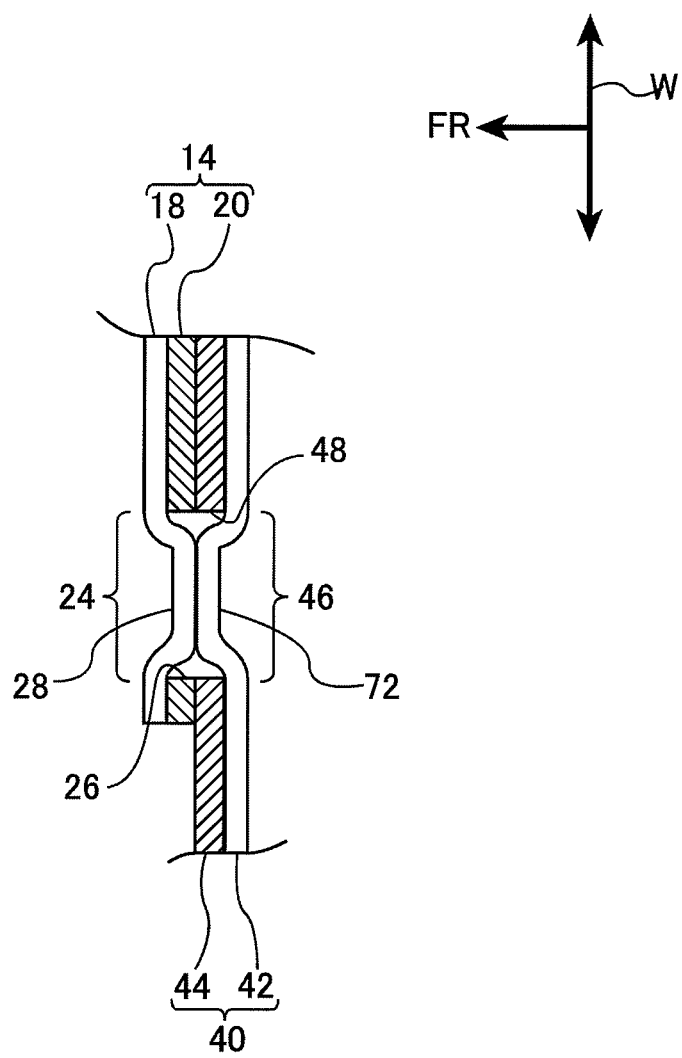
FIG. 11 is a cross-section illustrating a fastened state of a side frame and a lower panel employed in a seatback frame of a vehicle seat according to an exemplary embodiment of the present invention.

In the present exemplary embodiment, the positional relationship between the side frame base sections 18 and the side frame reinforcement sections 20, the positional relationship between the lower panel base section 42 and the lower panel reinforcement section 44, and the positional relationship between the upper cross-member base section 52 and the upper cross-member reinforcement section 54 may be respectively reversed. For example, as shown in FIG. 11, the lower panel base section 42 may be configured at a seat rear direction portion of the lower panel 40 and the lower panel reinforcement section 44 may be configured at a seat front direction portion of the lower panel 40. In such cases, protrusion portions 72 serving as projecting portions are provided to the lower panel base section 42 at the lower panel weld portions 46. The protrusion portions 72 project out towards the side frames 14 side (the seat front direction) and the protrusion portions 72 are disposed in the placement holes 48. The seat front direction faces of the protrusion portions 72 are thereby brought into contact with the seat rear direction faces of the protrusion portions 28 of the side frame base sections 18, and the lower panel base section 42 can be welded to the side frame base sections 18. In such cases a weld bond 70 may also be interposed between the protrusion portions 72 and the protrusion portions 28.

Figure 12:
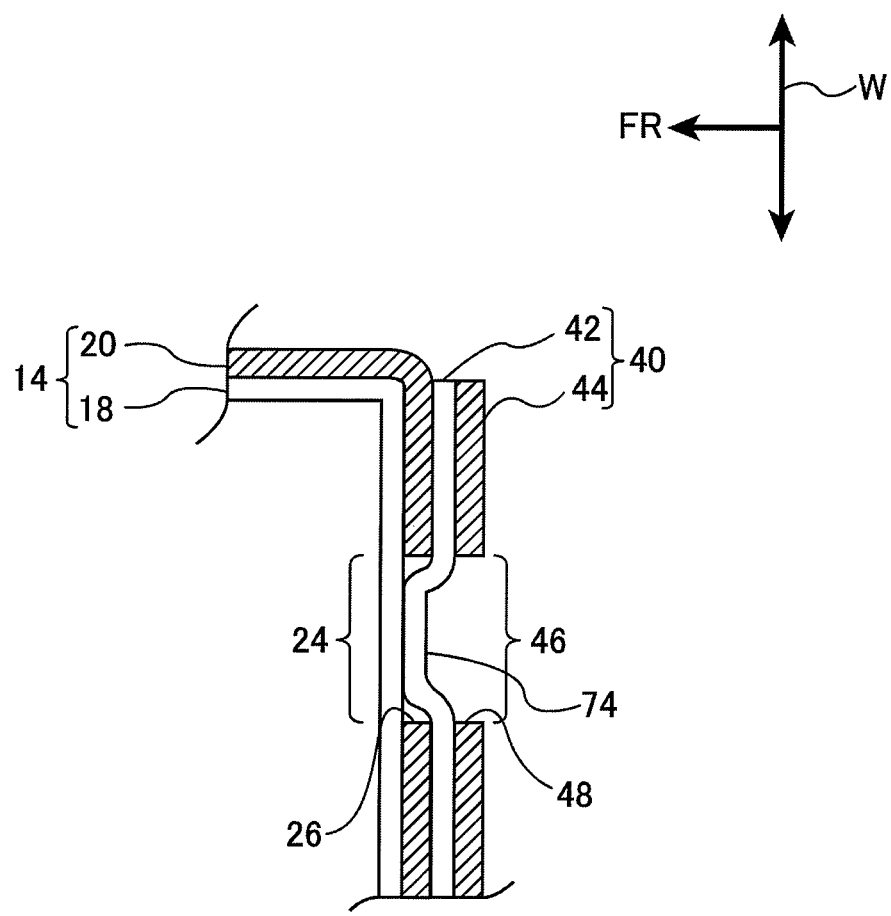
FIG. 12 is a cross-section illustrating a fastened state of a side frame and a lower panel employed in a seatback frame of a vehicle seat according to an exemplary embodiment of the present invention.

In the present exemplary embodiment, the protrusion portions 28 of the side frame base sections 18 project out towards the lower panel 40 side, and make contact with the lower panel base section 42. However alternatively, as shown in FIG. 12, the protrusion portions 28 of the side frame base sections 18 may be omitted, and configuration made with protrusion portions 74 serving as projection portions provided at the lower panel base section 42, and with the protrusion portions 74 configured so as to fit into the placement holes 26 of the side frames 14. The lower panel 40 can accordingly be temporarily assembled to the side frames 14 when the lower panel 40 is disposed at the seat rear direction of the side frames 14.

Furthermore, in the present exemplary embodiment, the side frame reinforcement sections 20, the lower panel reinforcement section 44 and the upper cross-member reinforcement section 54 are formed from CFRP. However alternatively the side frame reinforcement sections 20, the lower panel reinforcement section 44 and the upper cross-member reinforcement section 54 may, for example, be formed from glass fiber reinforced plastic (GFRP), which is a composite material of glass reinforcement fibers and resin. In other words, the side frames 14, the lower panel 40 and the upper cross-member 50 may be formed as components from a composite material (FRP) of reinforcement fibers and resin according to the load (stress) acting on thereon.

In the present exemplary embodiment, as an example the lower panel 40 is configured by the high tensile sheet steel-formed lower panel base section 42 and the CFRP-formed lower panel reinforcement section 44, however another member employed in the vehicle seat 10 may be configured similarly to the lower panel 40, and such a member may be fastened to the side frames 14. For example, a bracket, for supporting known S-springs for supporting the back region of an occupant, may be configured from a base section formed from high tensile sheet steel and from a reinforcement section formed from CFRP, and the bracket fastened to the side frames 14 by welding.

Furthermore, in the present exemplary embodiment, the lower panel 40 and the upper cross-member 50 are fastened to the side frames 14 by resistance welding. However alternatively, the lower panel 40 and the upper cross-member 50 may be fastened to the side frames 14 with fastening members such as bolts and nuts.

Figure 13:
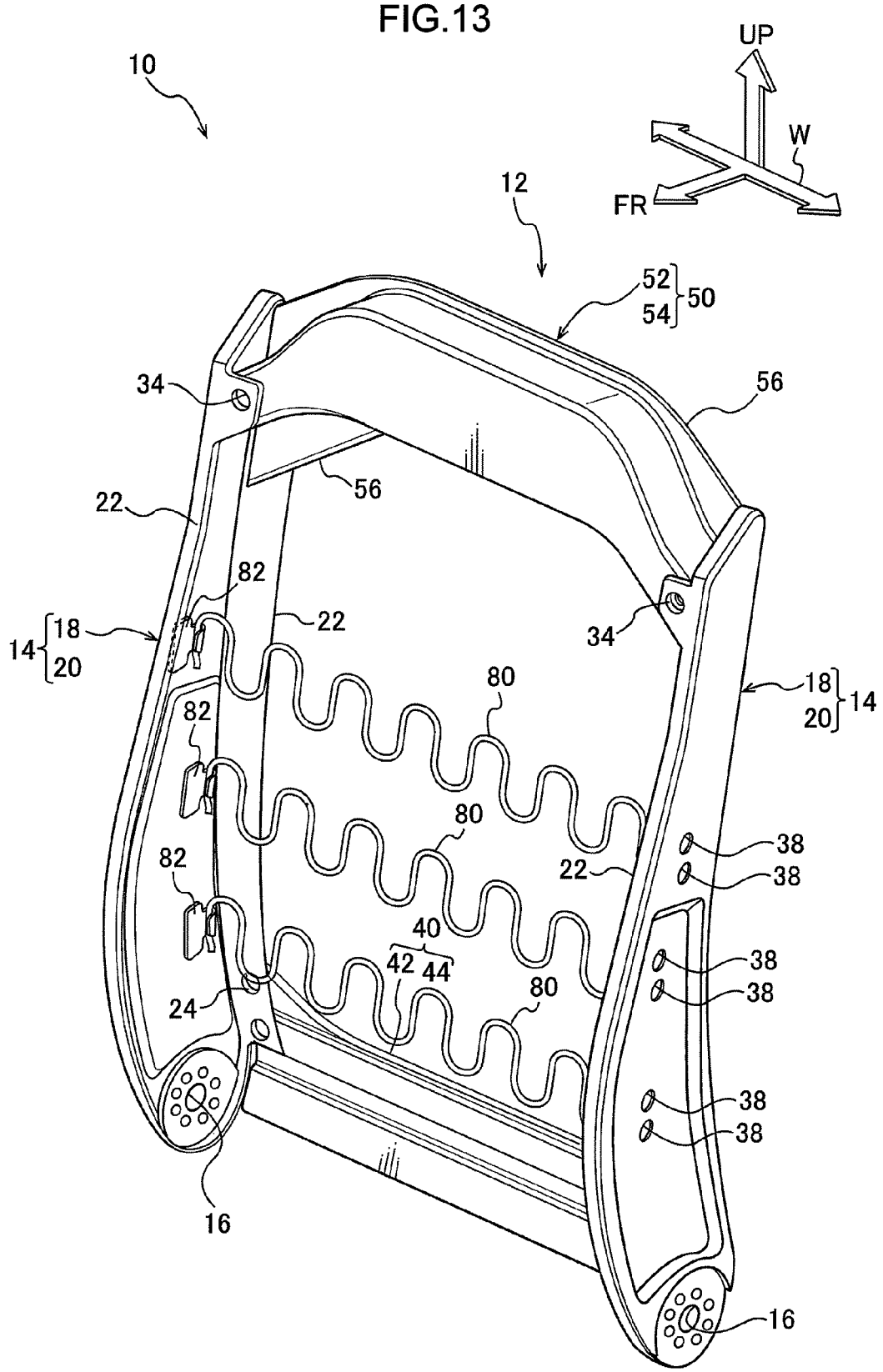
FIG. 13 is a perspective view illustrating a seatback frame of a vehicle seat according to an exemplary embodiment of the present invention, as viewed diagonally from the seat front.
Figure 14:
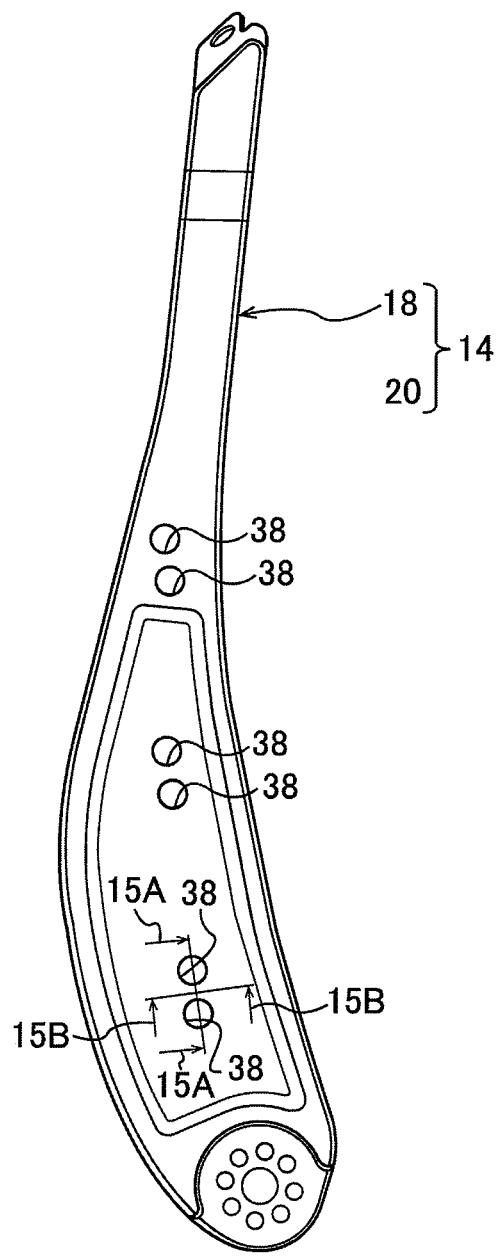
FIG. 14 is a side view from the seat width direction outside of the seatback frame illustrated in FIG. 13.
Figure 15A:
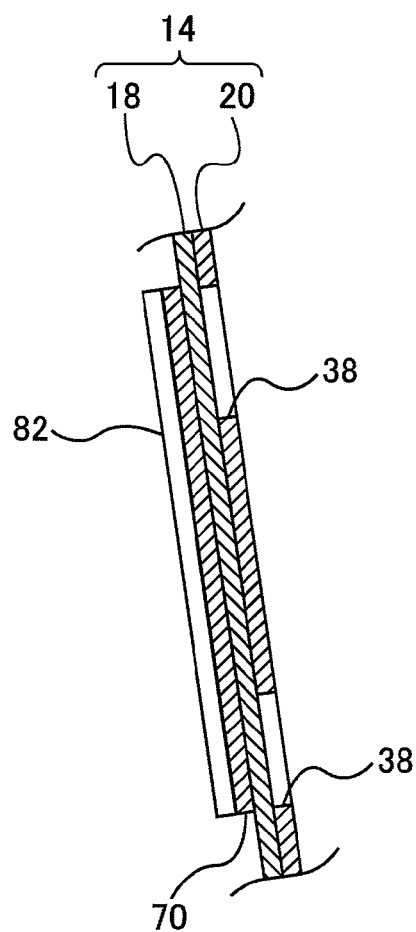
FIG. 15A is a cross-section illustrating a fastened state of the side frame and the bracket employed in the seatback frame illustrated in FIG. 13 (a cross-section taken on line 15A-15A of FIG. 14)
Figure 15B:
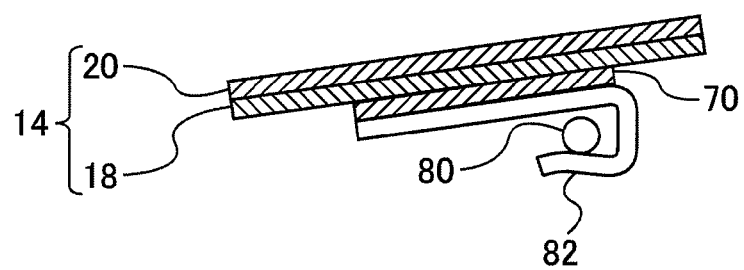
FIG. 15B is a cross-section illustrating a fastened state of the side frame and the bracket (a cross-section taken on line 15B-15B of FIG. 14).

In the present exemplary embodiment, new placement holes may be provided in the side frames 14, the lower panel 40 and the upper cross-member 50, and members made from sheet metal fastened thereto by resistance welding. For example, as shown in FIG. 13 to FIG. 15, when brackets 82 made from sheet metal (for example brackets for fixing S-springs 80 for supporting an occupant to the side frames 14) are additionally provided to the side frames 14, new placement holes 38 may be provided in the side frames 14 and the brackets 82 can be fastened (fixed) to the side frames 14 by resistance welding.

In such cases, a weld bond 70 as described above may also be interposed between the brackets 82 and the side frames 14. The fixing strength and rigidity between the side frames 14 and the projection portions 72 can accordingly be raised due to employing the combination of fastening with the weld bond 70 and fastening with welding.

What is claimed is:

1. A vehicle seat comprising:
    a fastened member comprising,
        a fastened member-side base section formed from metal, and
        a fastened member-side reinforcement section formed from fiber reinforced plastic (FRP), laminated in a sheet thickness direction over the whole of the fastened member-side base section so as to reinforce the fastened member-side base section; and
    a fastening member comprising,
        a fastening member-side base section formed from metal, and
        a fastening member-side reinforcement section formed from FRP, laminated in a sheet thickness direction over the whole of the fastening member-side base section so as to reinforce the fastening member-side base section;

wherein the fastening member is fastened to the fastened member by bringing the fastening member-side base section into contact with the fastened member-side base section;

wherein an exposed portion is provided only at the fastened member-side reinforcement section and/or the fastening member-side reinforcement section so as to expose a portion of the fastened member-side base section and/or the fastening member-side base section; and wherein a projection portion is provided at the fastened member-side base section and/or the fastening member-side base section, projecting out towards an exposed portion side and being disposed inside the exposed portion.

2. The vehicle seat of claim 1, wherein at a fastening location of the fastened member and the fastening member, an adhesive is interposed between the fastened member-side base section and the fastening member-side base section and the fastened member and the fastening member are also fastened by welding.

3. The vehicle seat of claim 1, wherein the fastening member configures a lower panel of a seatback frame of the vehicle seat and the fastened member configures a pair of side frames of the seatback frame of the vehicle seat.

4. The vehicle seat of claim 1, wherein the fastening member configures an upper cross-member of a seatback frame of the vehicle seat and the fastened member configures a pair of side frames of the seatback frame of the vehicle seat.

5. The vehicle seat of claim 1, wherein the exposed portion is configured by a hole formed through the fastened member-side reinforcement section and/or the fastening member-side reinforcement section.

* * * * *